United States Patent [19]

Soriente

[11] 4,392,955
[45] Jul. 12, 1983

[54] LIQUID TREATMENT APPARATUS

[75] Inventor: Alfonse J. Soriente, Gillette, N.J.

[73] Assignee: Ecodyne Corporation, Union, N.J.

[21] Appl. No.: 107,007

[22] Filed: Dec. 26, 1979

[51] Int. Cl.³ .......................... B01D 19/04; C02B 1/10
[52] U.S. Cl. .................................. 210/195.4; 210/197;
210/528
[58] Field of Search .................... 210/221 P, 520, 528,
210/137, 195 S, 197, 195.4

[56] References Cited

U.S. PATENT DOCUMENTS

| | | | |
|---|---|---|---|
| 2,090,384 | 8/1937 | Durpin | 210/8 |
| 2,346,366 | 4/1944 | Durpin | 259/87 |
| 2,695,710 | 11/1954 | Gibbs | 210/53 |
| 3,227,278 | 1/1966 | Johnson | 210/137 X |
| 3,397,788 | 8/1968 | Duff et al. | 210/195 |
| 3,415,378 | 12/1968 | Fukuda | 210/152 |
| 3,473,661 | 10/1969 | Duff | 210/82 |
| 3,473,665 | 10/1969 | Duff | 210/188 |
| 3,865,721 | 2/1975 | Kaelin | 210/7 |
| 3,929,640 | 12/1975 | Dohnert | 210/195 |
| 3,951,806 | 4/1976 | Young | 210/197 |

Primary Examiner—Frank A. Spear, Jr.
Attorney, Agent, or Firm—Dressler, Goldsmith, Shore, Sutker & Milnamow, Ltd.

[57] ABSTRACT

In liquid sedimentation and clarification apparatus recirculation of previously settled solids is controlled without affecting the volume or rate of flow of incoming untreated liquid. A throttle plate is placed above an updraft tube in the liquid flow path. Movement of the throttle plate toward or away from the end of the updraft tube alters the quantity of settled solids that are mixed with the incoming liquid during the treatment process.

5 Claims, 3 Drawing Figures

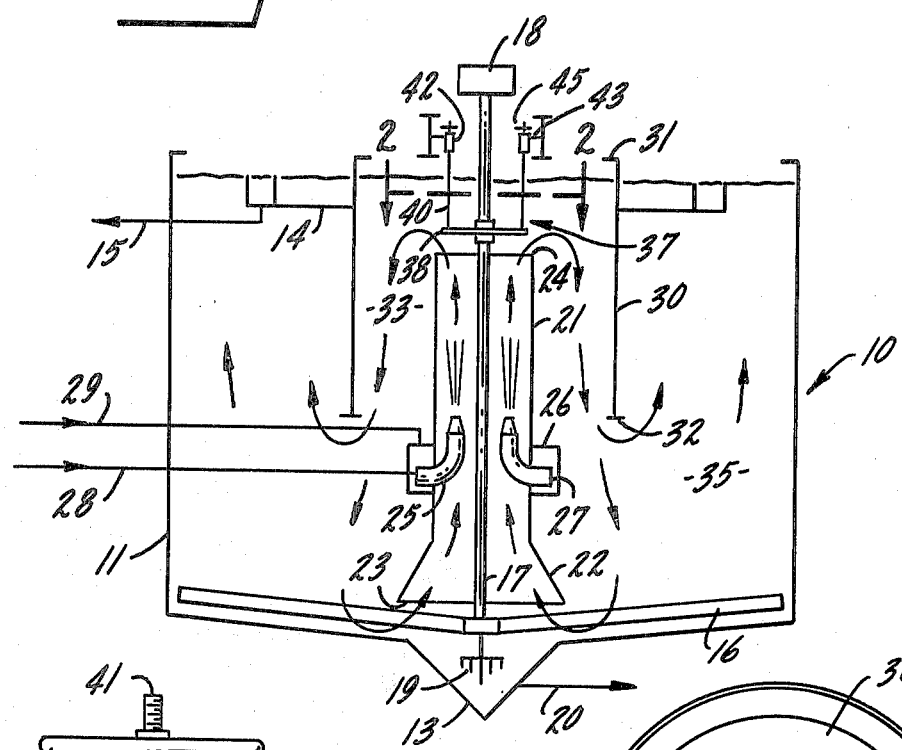
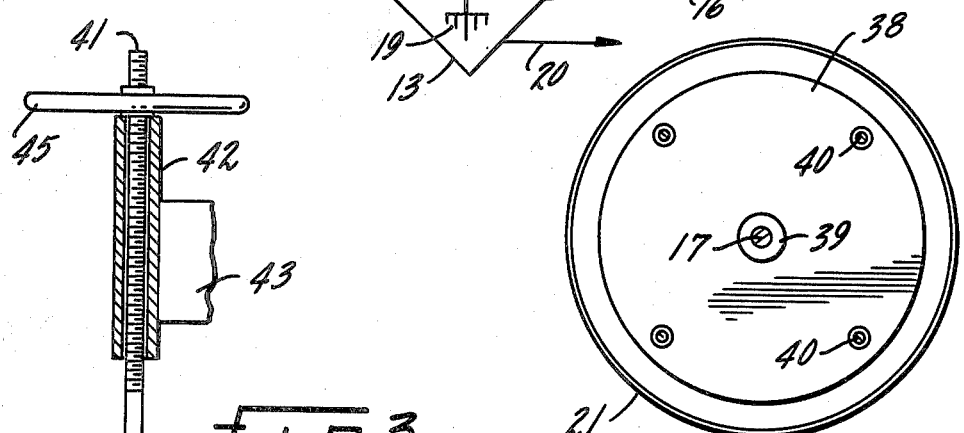
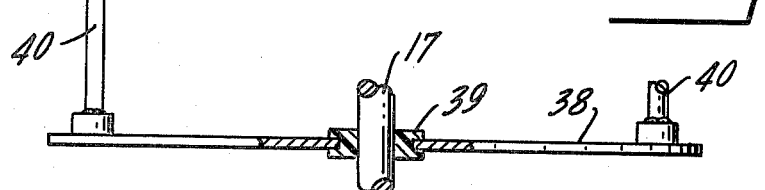

4,392,955

LIQUID TREATMENT APPARATUS

BACKGROUND OF THE INVENTION

This invention relates to apparatus for treating liquids and more particularly to apparatus that employs sedimentation to remove unwanted materials from water.

In sedimentation apparatus having a plurality of liquid treatment zones, optimum treatment results can be attained when flow of solids between such zones is controllable over a wide range of operating conditions. Such apparatus may have a solids settling zone, a solids mixing and recirculation zone and a solids uptake zone. The bottom of the uptake zone communicates with the settling zone and the upper end of the uptake zone communicates with the mixing and recirculation zone. The lower portion of the mixing and recirculation zone communicates with the settling zone. Solids from the settling zone and treatment chemicals are mixed with incoming untreated liquid in the uptake zone. This can be achived by flowing the incoming liquid and treatment chemicals into the uptake zone through nozzles which cause a turbulent updraft that draws in settled solids.

The quantity of solids recirculating in such apparatus should be maintained in an optimum range to insure ample solids to achieve coagulation and clarification, while preventing solids from being discharged with the treated liquid. When the volume of liquid flowing through the apparatus changes, the quantity of solids being recirculated will also change. Prior arrangements used to adjust the recirculation of solids to compensate for changes in liquid flow have had a limited flow control range in the order of two to one or less.

OBJECTS OF THE INVENTION

Accordingly, it is an object of this invention to provide improved liquid treatment apparatus that can attain optimum operating conditions over a wider range of liquid flow volumes.

Another object is to more accurately control the volume of solids recirculating in liquid sedimentation apparatus.

Another object is to provide means for controlling recirculation of solids in sedimentation apparatus that does not alter the influent flow or require changing the angle or volume of liquid flowing through nozzles.

Another object is to provide better mixing of recirculated solids in the uptake zone of a liquid clarifier.

Another object is to provide improved control of the conditions in the solids mixing and recirculation zone of liquid treatment apparatus.

Another object is to provide simple, durable, non-clogging means for controlling the solids recirculation rate in water sedimentation apparatus that is relatively low cost, easily maintained and which does not possess defects found in similar prior art apparatus.

Other objects and advantages of the invention will be revealed by the specification and claims, and the scope of the invention will be set forth in the claims.

DESCRIPTION OF THE DRAWING

FIG. 1 is a cross sectional view of a schematic representation of liquid treatment apparatus embodying the invention.

FIG. 2 is a cross sectional view taken along the line 2—2 in FIG. 1.

FIG. 3 is an enlarged partially cross sectional view of the throttle plate lifing mechanism shown in FIGS. 1 and 2.

DESCRIPTION OF A PREFERRED EMBODIMENT

The drawing shows apparatus 10 for treating and clarifying liquids by sedimentation. This type of apparatus may be used for softening water by the cold lime-soda ash process, and for the clarification of waters containing suspended solids, color, and organic impurities by coagulation with alum or ferric sulfate or other coagulants. Coagulation and softening may be carried out simultaneously. The coagulants or precipitates formed within the apparatus have an enormous surface area upon which the dissolved or colloidally dispersed impurities are absorbed. The suspended impurities are surrounded by the gelatinous precipitates and themselves become part of the precipitate, which settles to the bottom of the apparatus.

To soften water by this process, calcium hydroxide is added to precipitate the calcium bicarbonate as calcium carbonate and the magnesium salts as magnesium hydroxide. Sodium carbonate is added to react with the calcium chloride and calcium sulfate originally present in the water, as well as that formed by the reaction of calcium hydroxide with magnesium chloride and sulfate. The reaction of sodium carbonate with these salts forms calcium carbonate. Thus, calcium and magnesium salts originally present in the water are removed as the slightly soluble compounds, calcium carbonate and magnesium hydroxide precipitate out. A coagulant such as alum, sodium aluminate, or ferric sulfate may be employed in the treatment to assist in the separation of the turbidity, precipitates, and other solids formed from the water.

Apparatus 10 comprises a cylindrical open-topped tank 11 having a bottom 12 which slopes downwardly to a conical sump 13 for collecting settled solids. An overflow weir 14 adjacent the upper end of tank 11 collects treated water for discharge through an outlet line 15, and determines the upper surface level of the water in tank 11. A rotatable rake 16 adjacent bottom 12 scrapes settled solids toward sump 13. Rake 16 is attached to vertical shaft 17 which is turned by a motor and gear box assembly 18 in conventional manner. Shaft 17 passes through the center of tank 11. Sludge thickeners 19 in sump 13 are also rotated by shaft 17, and settled solids are removed from the sump for disposal through an outlet line 20.

A cylindrical, open-ended vertical updraft tube 21 is coaxial with shaft 17. Tube 21 may have a predetermined constant diameter for most of its length and an enlarged lower end portion 22. The bottom end 23 of enlarged portion 22 terminates above but adjacent to rake 16. The upper end 24 of tube 21 terminates below the upper surface of the water in tank 11. A plurality of upwardly directed nozzles 25 are evenly spaced around the inside of the tube 21 intermediate its ends. A manifold 26 for untreated water surrounds tube 21 and an end 27 of each nozzle 25 communicates with the inside of the manifold. An inlet line 28 connects manifold 26 to a pressurized source of untreated water. The pressurized water flowing from nozzles 25 flows rapidly up and out of upper end 24 of tube 21; this draws settled solids from the bottom of tank 11 into lower end 23 and forces such settled solids through tube 21 and out its upper end 24 with the incoming untreated water. Thus, the inside surface of tube 21 defines a solids uptake zone for transporting previously settled solids into the upper portion of tank 11. Water treating chemicals may be mixed with the incoming untreated water and fed in through line 28, or they may be added separately through one or more chemical inlet lines, such as 29.

A cylindrical baffle 30 surrounds and is coaxial with tube 21. The upper end 31 of baffle 30 extends above the upper surface of the water in tank 11, and the lower end 32 of baffle 30 terminates above the lower end 23 of tube 21. The inside surface of baffle 30 defines a generally annular solids mixing and recirculation zone 33 above and around tube 21 within the confines of the baffle. The turbulent liquid flow in zone 33 mixes the treatment chemicals and the incoming untreated water with the previously settled solids from the bottom of tank 11. Such previously settled solids will adhere to newly formed precipitates and to solids that enter with the untreated water and thereby can increase the overall solids settling rate of apparatus 10 when the previously settled solids are present in the proper ratio. The outer surface of baffle 30 and the inside of tank 11 define a solids settling or sedimentation zone 35 that surrounds baffle 30 and tube 21.

Apparatus 10 is provided with means 37 that can control the quantity of previously settled solids drawn upwardly into tube 21 over a wide range of liquid flow and other operating conditions. Control means 37 includes a circular throttle plate or disc 38 that is coaxial with tube 21. The diameter of plate 38 is slightly smaller than that of tube 21, and shaft means 17 passes through a bushing 39 in the center of plate 38. Throttle plate 38 is located above upper end 24 of tube 21 in the flow path of the water and solids leaving tube 21. The quantity of solids drawn upwardly into and through tube 21 is controlled by the vertical location or spacing of plate 38 above tube upper end 24. As the incoming liquid flow rate through line 28 changes, the quantity of solids mixed with the incoming liquid can be kept at an optimum level by raising or lowering plate 38. If the rate of flow through inlet line 28 remains constant but a change in other operating conditions necessitate a change in the quantity of solids recirculated through tube 21, this can be accomplished by repositioning plate 38 without altering the rate of flow through nozzles 25.

The vertical location of plate 38 above tube end 24 may be controlled by attaching the lower ends of a series of threaded rods 40 to the upper surface of the plate. The upper ends 41 of the rods pass through unmovable sleeves 42 which are connected by brackets 43 to any conveniently located structural support members 44 of apparatus 10. Hand wheels 45 threaded on to rod upper ends 41 each bear against the upper end of a sleeve 42. Plate 38 may be moved toward or away from tube upper end 24 by rotating wheels 45 so that rods 40 are drawn up or pushed down through sleeves 42.

Apparatus 10 may include conventional clarifier components and structural members, such as supports for the baffle, tube and weir, handrails, walkways and the like. However, such items have not been shown or described because their details do not form a part of the present invention.

It has thus been shown that by the practice of this invention, a liquid clarifier or sedimentation apparatus may be run at an optimum flow rate, even though other operating conditions are changing. This is accomplished because the incoming liquid flow rate need not be changed in order to change the settled solids recirculation rate. Merely by moving throttle plate 38 toward or away from tube 21 a flow control range of four to one for the quantity of solids recirculated can be attained. The mechanism employed can be operated from outside the treatment tank, and the incoming untreated liquid can be fed into the tank from center column or over the tank top in addition to the manner shown.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. Liquid treating apparatus comprising:
   A. a tank having a treated liquid outlet adjacent its upper end and a settled solids outlet adjacent its bottom, a rotatable rake adjacent the bottom of said tank for moving settled solids toward said settled solids outlet, and power-driven vertical shaft means coaxial with the center of said tank connected to said rake for rotating said rake;
   B. a generally circular, open-ended vertical updraft tube of predetermined diameter surrounding and coaxial with said shaft means, the lower end of said tube terminating above said rake, the upper end of said tube terminating below the upper surface of the liquid in said tank, an upwardly directed untreated liquid inlet nozzle within said tube, means connecting said nozzle to a pressurized source of untreated liquid for causing such untreated liquid from said nozzle to flow rapidly up and out of said upper end of said tube and thereby to draw settled solids into said lower end of said tube and through said tube where such solids mix with such untreated liquid;
   C. generally circular baffle means surrounding and coaxial with said tube, the upper end of said baffle means extending above the upper surface of the liquid in said tank, and the lower end of said baffle means terminating above said lower end of said tube, said baffle means defining a solids mixing and recirculation zone in said tank surrounding said tube; and
   D. means for controlling the amount of settled solids drawn upwardly into said tube comprising a substantially flat circular disc coaxial with said tube, said disc being constructed and arranged so that it is always positioned above and entirely outside of said tube in the flow path of liquid leaving said tube upper end, said shaft means passing through the center of said disc, and means outside of said tube for moving said disc vertically toward and away from said tube upper end, whereby the upward flow of settled solids in said tube is controlled by the vertical position of said disc outside of said tube.

2. The invention defined in claim 1, wherein the diameter of said disc is smaller than said diameter of said tube.

3. The invention defined in claim 1, wherein said means for moving said disc comprises a threaded rod having its lowermost end attached to said disc.

4. The invention defined in claim 1, further comprising a plurality of upwardly directed untreated liquid inlet nozzles in said tube, a manifold for untreated liquid around said tube, an end of each of said nozzles being in communication with the inside of said manifold, and means outside of said tube connecting said manifold to said source of untreated liqiud.

5. Water treating apparatus comprising:
A. a cylindrical open-topped tank having a treated water overflow outlet weir adjacent its upper end and a sump for collecting settled solids at its bottom, a rotatable rake adjacent said bottom for moving settled solids toward said sump, power driven vertical shaft means coaxial with the center of said tank connected to said rake for rotating said rake, and means for removing settled solids from said sump;
B. a generally cylindrical, open-ended vertical updraft tube of predetermined diameter surrounding and coaxial with said shaft means, the lower end of said tube terminating above but adjacent said rake, the upper end of said tube terminating below the upper surface of the water in said tank, a plurality of upwardly directly untreated water inlet nozzles in said tube, a manifold for untreated water surrounding said tube, an end of each of said nozzles being connected to the inside of said manifold, and means outside of said tube connecting said manifold to a pressurized source of untreated water, the pressurized water from said nozzles flowing rapidly up and out of said upper end of said tube and drawing settled solids into said lower end of said tube and through said tube where such solids mix with such untreated water;
C. a cylindrical baffle surrounding and coaxial with said tube, the upper end of said baffle extending above the upper surface of the water in said tank, and the lower end of said baffle terminating above said lower end of said tube, said baffle defining a mixing and recirculation zone in said tank surrounding said tube; and
D. means for controlling the quantity of settled solids drawn upwardly into said tube comprising a substantially flat circular disc coaxial with said tube, the diameter of said disc being smaller than said diameter of said tube, said disc being constructed and arranged so that it is always positioned above and entirely outside of said tube in the flow path of water leaving said tube upper end, said shaft means passing through the center of said disc, means outside of said tube for moving said disc vertically toward and away from said tube upper end comprising a plurality of threaded rods having their lowermost ends attached to said disc, whereby the upward flow of settled solids in said tube is controlled by the vertical position of said disc outside of said tube; and
E. means defining a solids settling zone including the lower portion of said tank.

* * * * *